US012340928B2

(12) United States Patent
Yen et al.

(10) Patent No.: US 12,340,928 B2
(45) Date of Patent: Jun. 24, 2025

(54) TRANSFORMER DEVICE

(71) Applicant: REALTEK SEMICONDUCTOR CORPORATION, Hsinchu (TW)

(72) Inventors: Hsiao-Tsung Yen, Hsinchu (TW); Po-Chih Wang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 653 days.

(21) Appl. No.: 17/512,696

(22) Filed: Oct. 28, 2021

(65) Prior Publication Data

US 2022/0157506 A1 May 19, 2022

Related U.S. Application Data

(60) Provisional application No. 63/115,073, filed on Nov. 18, 2020.

(30) Foreign Application Priority Data

Mar. 31, 2021 (TW) ................................ 110111936

(51) Int. Cl.
*H01F 27/28* (2006.01)
*H01F 17/00* (2006.01)

(52) U.S. Cl.
CPC . *H01F 17/0013* (2013.01); *H01F 2017/0073* (2013.01)

(58) Field of Classification Search
CPC ......... H01F 17/0013; H01F 2017/0073; H01F 27/29; H01F 27/38; H01F 27/28
(Continued)

(56) References Cited

U.S. PATENT DOCUMENTS 7,675,365 B2 3/2010 Lee
8,198,970 B2 6/2012 Choi et al.
(Continued)

FOREIGN PATENT DOCUMENTS

CN 101242159 A 8/2008
CN 103377809 A 10/2013
CN 106710847 A 5/2017

OTHER PUBLICATIONS

Yen et al., Transformer Device, U.S. Appl. No. 17/313,036, filed May 6, 2021 (YYYY-MM-DD).
(Continued)

*Primary Examiner* — Shawki S Ismail
*Assistant Examiner* — Kazi S Hossain
(74) *Attorney, Agent, or Firm* — WPAT, PC

(57) ABSTRACT

A transformer device includes a first coil, a second coil, and a third coil. The first coil includes first segments and at least one first connecting portion, in which the first segments are coupled to each other through the at least one first connecting portion. The second coil includes second segments and second connecting portions, in which the of second segments are coupled to each other through the second connecting portions. The third coil is configured to couple the first coil and the second coil. The third coil includes third segments and third connecting portions, a part of the plurality of third segments are coupled in parallel with each other through the third connecting portions, and at least one part of the first segments and at least one part of the second segments are arranged between the part of the third segments.

17 Claims, 7 Drawing Sheets

(58) Field of Classification Search
USPC ................................ 336/170, 200, 198, 192
See application file for complete search history.

(56) References Cited

U.S. PATENT DOCUMENTS

| | | | | |
|---|---|---|---|---|
| 10,340,880 | B2 | 7/2019 | Yen | |
| 2003/0089963 | A1 | 5/2003 | Davies | |
| 2007/0296537 | A1 | 12/2007 | Yoon | |
| 2008/0164941 | A1* | 7/2008 | Lee | H03F 1/3211<br>330/195 |
| 2010/0117737 | A1 | 5/2010 | Kondo | |
| 2010/0148866 | A1 | 6/2010 | Lee et al. | |
| 2011/0037555 | A1 | 2/2011 | Lai | |
| 2013/0265132 | A1* | 10/2013 | Huang | H01F 27/29<br>336/200 |
| 2014/0077919 | A1* | 3/2014 | Godoy | H01F 30/08<br>336/226 |
| 2016/0086725 | A1* | 3/2016 | Igarashi | H01F 27/2823<br>336/83 |
| 2017/0012601 | A1* | 1/2017 | Yen | H01L 23/5227 |
| 2019/0109612 | A1 | 4/2019 | Robert | |

OTHER PUBLICATIONS

OA letter of a counterpart CN application (appl. no. 202110415860.1) mailed on Mar. 26, 2025.

OA letter of a counterpart CN application (appl. no. 202110425309.5) mailed on Mar. 20, 2025.

* cited by examiner

TRANSFORMER DEVICE

BACKGROUND OF THE DISCLOSURE

1. Field of the Disclosure

The present disclosure relates to a transformer device. More particularly, the present disclosure relates to a planar transformer device for power combination.

2. Description of Related Art

Certain integrated circuits (ICs) for radio frequency signals have to convert signals between a common mode and a differential mode. A BALUN is usually utilized in this kind of signal conversion. A BALUN is one of many applications of a transformer and is implemented with coil(s) in the ICs. Therefore, a good design for coils in terms of excellent coupling, higher quality factor, and improved line balancing becomes more and more significant.

SUMMARY

In some aspects, a transformer device includes a first coil, a second coil, and a third coil. The first coil includes first segments and at least one first connecting portion, in which the first segments are coupled to each other through the at least one first connecting portion. The second coil includes second segments and second connecting portions, in which the of second segments are coupled to each other through the second connecting portions. The third coil is configured to couple the first coil and the second coil. The third coil includes third segments and third connecting portions, a part of the plurality of third segments are coupled in parallel with each other through the third connecting portions, and at least one part of the first segments and at least one part of the second segments are arranged between the part of the third segments.

These and other objectives of the present disclosure will no doubt become obvious to those of ordinary skill in the art after reading the following detailed description that are illustrated in the various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, "about" or "substantially" shall generally mean within 20 percent, preferably within 10 percent, and more preferably within 5 percent of a given value or range. Numerical quantities given herein are approximate, meaning that the term "about" or "substantially" can be inferred if not expressly stated.

Further, for ease of description, spatially relative terms, such as "left," "right," "lower," "upper," "below," "over," and the like, may be used herein to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1A:
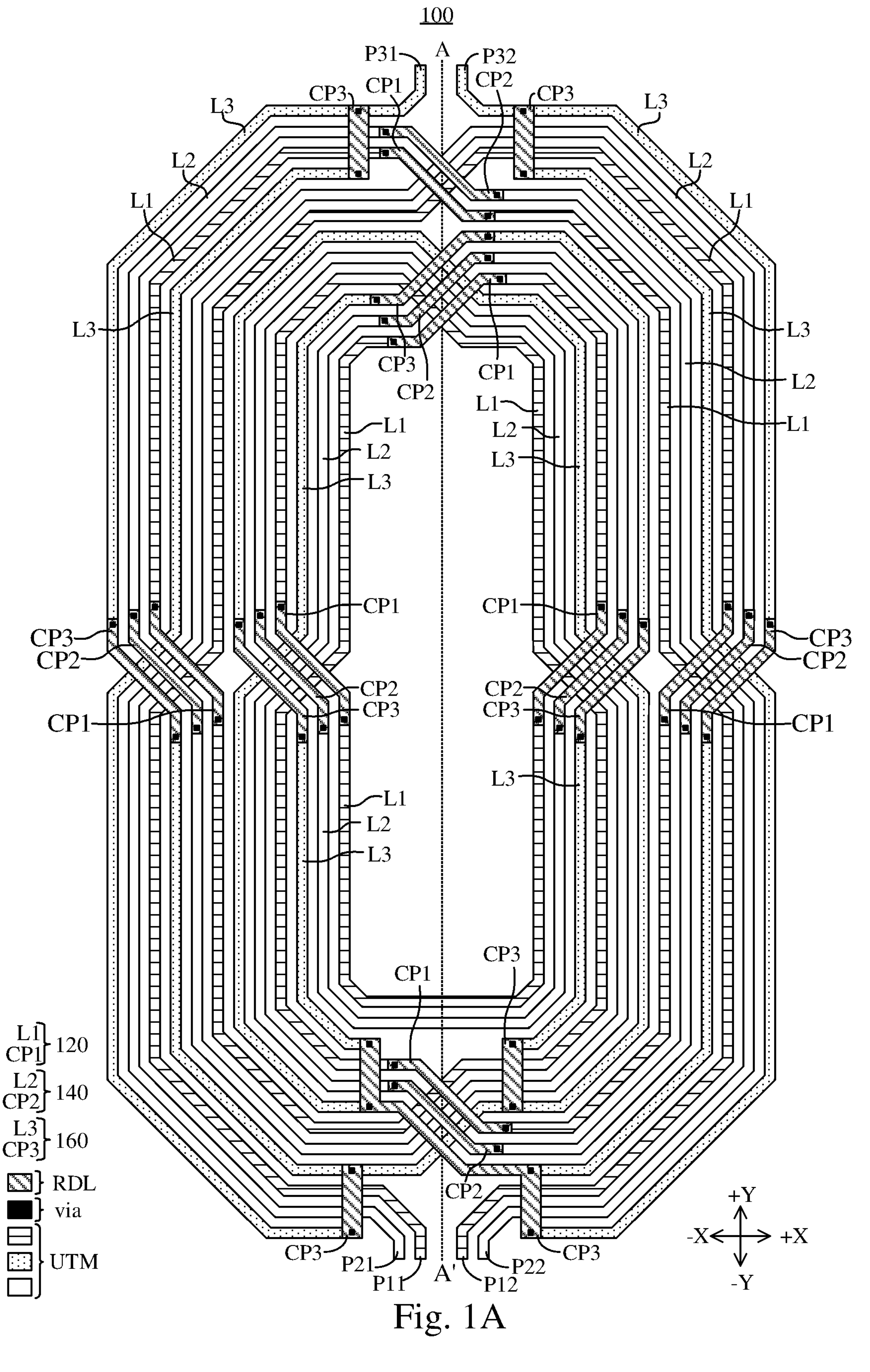
FIG. 1A is a schematic diagram of a transformer device according to some embodiments of the present disclosure.
Figure 1B:
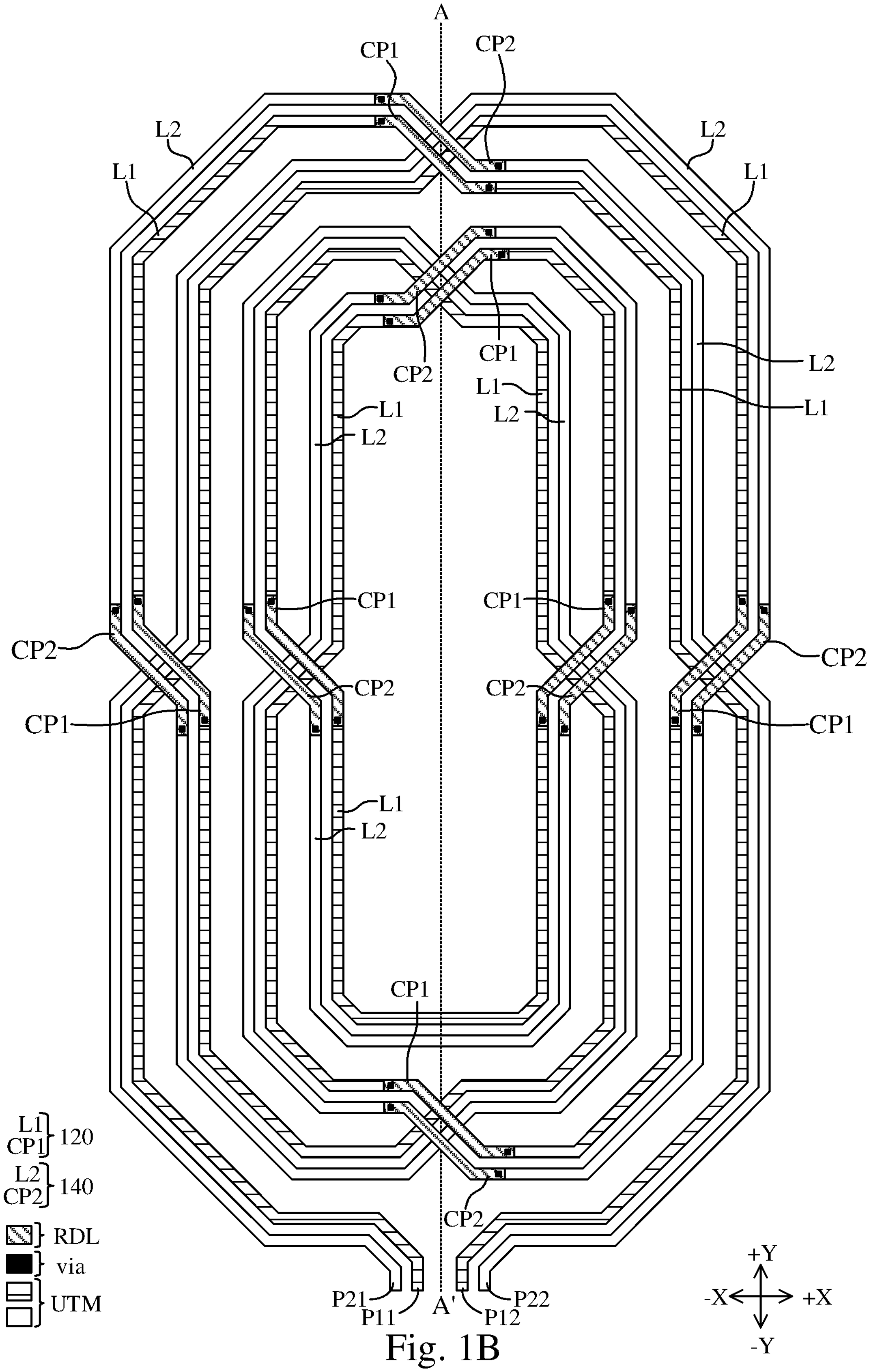
FIG. 1B is a schematic diagram of two coils in FIG. 1A according to some embodiments of the present disclosure.
Figure 1C:
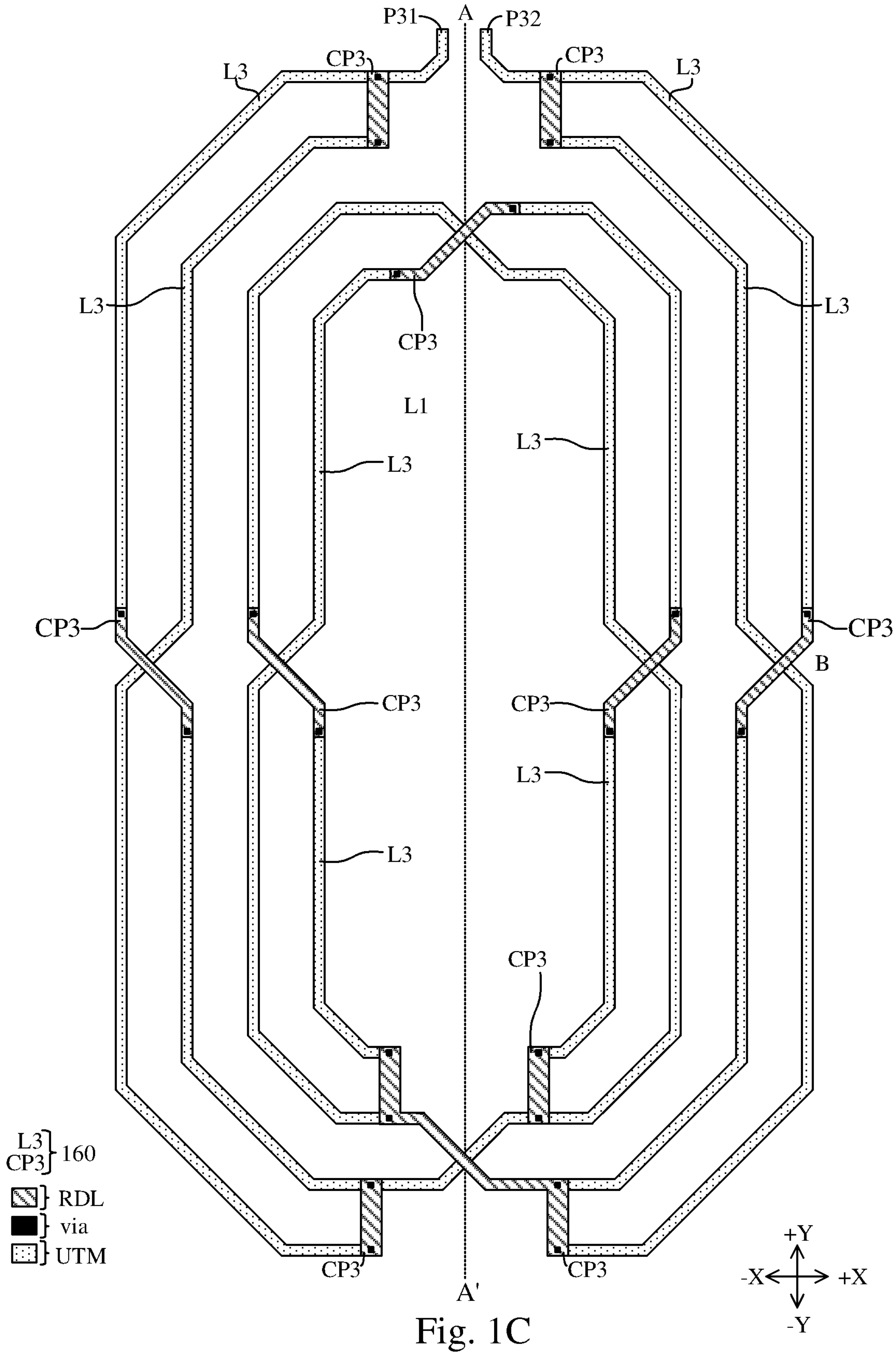
FIG. 1C is a schematic diagram of a coil in FIG. 1A according to some embodiments of the present disclosure.

Reference is made to FIG. 1A to FIG. 1C, FIG. 1A is a schematic diagram of a transformer device 100 according to some embodiments of the present disclosure, FIG. 1B is a schematic diagram of a coil 120 and a coil 140 in FIG. 1A according to some embodiments of the present disclosure, and FIG. 1C is a schematic diagram of the coil 160 in FIG. 1A according to some embodiments of the present disclosure. In some embodiments, the transformer device 100 may operate (but not limited to) as a power combiner, which may couple signals from two symmetrical coils to a single coil, in order to output a single signal. For ease of understanding, components in the transformer device 100 are separately shown in FIG. 1B and FIG. 1C. In some embodiments, the transformer device 100 is formed with the coils 120 and 140 in FIG. 1B and the coil 160 in FIG. 1C.

Each of the coil 120 and the coil 140 may be a planar coil. As shown in FIG. 1B, the coil 120 includes segments L1 (shown in horizontal stripes) and connecting portion CP1 (shown in diagonal stripes). The segments L1 are coupled to each other through the connecting portions CP1, in order to form the coil 120. For example, at least one via (shown in black) is arranged on each of two terminals of each connecting portion CP1, in order to couple the connection portion CP1 to the corresponding segment L1. Similarly, the coil 140 includes segments L2 (shown in white) and connecting portions CP2 (shown in diagonal stripes). The segments L2 are coupled to each other through the connecting portions CP2, in order to form the coil 140. For example, at least one via is arranged on each of two terminals of each connecting portion CP2, in order to couple the connecting portion CP2 to the corresponding segment L2.

In some embodiments, each of the coils 120 and 140 may operate as a differential inductor. For example, the coil 120 includes a terminal P11 and a terminal P12. The terminal P11 and the terminal P12 may output (or receive) a set of differential signals. In some embodiments, a middle terminal (not shown) between the terminal P11 and the terminal P12 may be configured to receive a common mode voltage (e.g., an AC ground voltage). A wire length between the terminal P11 and the middle terminal is substantially the same as that between the terminal P12 and the middle terminal. In some embodiments, the middle terminal may operate as a center tap terminal. Similarly, the coil 140 includes a terminal P21 and a terminal P22. The terminal P21 and the terminal P22 may output (or receive) a set of differential signals. In some embodiments, a middle terminal between the terminal P21 and the terminal P22 may be configured to receive a common mode voltage (e.g., an AC ground voltage). A wire length between the terminal P21 and the terminal is substantially the same as that between the terminal P22 and the middle terminal. In some embodiments, the middle terminal may operate as a center tap terminal.

In some embodiments, a reference line A-A' is presented at a central location between the terminal P11 and the terminal P12, such that the coil 120 and the coil 140 are substantially mirror images of each other with respect to the reference line A-A'. It is understood that, the reference line A-A' is substantially arranged at a central location between the coil 120 and the coil 140, and the reference line A-A' is not a physical component in the transformer device 100.

The coil 160 may be a planar inductor, which is configured to couple the coil 120 and the coil 140. As shown in FIG. 1C, the coil 160 includes segments L3 (shown in dots) and connecting portions CP3 (shown in diagonal stripes). The segments L3 are coupled to each other through the connecting portions CP3, in order to form a ring structure. For example, at least one via is arranged on each of two terminals of each connecting portion CP3, in order to couple the connecting portion CP3 to the corresponding segments L3. The coil 160 may be applied to (but not limited to) a single-ended signaling. For example, the coil 160 includes a terminal P31 and a terminal P32. The terminal P31 may receive a single-end signal, and the terminal P32 may receive a DC voltage (e.g., a common mode voltage or a ground voltage). In some embodiments, the ring structure of the coil 160 has a mirror image symmetry with respect to the reference line A-A'. In other words, as shown in FIG. 1A, the transformer device 100 substantially has a bilateral symmetry structure. In some embodiments, a middle terminal between the terminal P31 and the terminal P32 may be configured to receive a common mode voltage (e.g., an AC ground voltage). A wire length between the terminal P31 and the middle terminal is substantially the same as that between the terminal P32 and the middle terminal. In some embodiments, the middle terminal may operate as a center tap terminal.

As shown in FIG. 1A or FIG. 1B, the segments L1 and the connecting portions CP1 form a first winding having four turns. For example, from the terminal P11 to the terminal P12, the segments L1 and the connecting portions CP1 sequentially form about a quarter of a first turn (e.g., an outermost turn), about a quarter of a second turn, about a quarter of the first turn, about a quarter of the second turn, about a quarter of a third turn, about a quarter of a fourth turn (e.g., an innermost turn), about a quarter of the third turn, about a half of the fourth turn, about a quarter of the third turn, about a quarter of the fourth turn, about a quarter of third turn, about a quarter of the second turn, about a quarter of the first turn, about a quarter of the second turn, and about a quarter of the first turn. Similarly, the segments L2 and the connecting portions CP2 form a second winding having four turns. For example, from the terminal P21 to the terminal P22, the segments L2 and the connecting portions CP2 sequentially form about a quarter of a first turn (e.g., an outermost turn), about a quarter of a second turn, about a quarter of the first turn, about a quarter of the second turn, about a quarter of a third turn, about a quarter of a fourth turn (e.g., an innermost turn), about a quarter of the third turn, about a half of the fourth turn, about a quarter of the third turn, about a quarter of the fourth turn, about a quarter of third turn, about a quarter of the second turn, about a quarter of the first turn, about a quarter of the second turn, and about a quarter of the first turn.

As mentioned below, the segments L1, L2, L3, the connecting portions CP1, CP2, and CP3 forms crossing portions in two opposite sides of the coil 160. In some embodiments, these crossing portions are formed by each turn in the first winding and the second winding and the coil 160 in the two opposite sides. In some embodiments, the two opposites may be a first side and a second side, the first side is a side along the direction of −X, and the second side is a side along the direction of +X. In some embodiments, the terminals P31 and P32 are arranged in a third side (e.g., a side along the direction of +Y) of the coil 160, and the terminals P11, P12, P21, and P22 are arranged in a fourth side (e.g., a side along the direction of −Y) of the coil 160, in which the third side and the fourth side are different from the first side and the second side. In other words, the crossing portions and the terminal P11, P12, P21, P22, P31 or P32 are arranged in different sides. Moreover, the crossing portions in the first side are symmetrical to the crossing portions in the second side.

In FIG. 1A, in the first side (e.g., the side along the direction of −X) of the coil 160, each of the coils 120 and 140 crosses the coil 160 four times. For example, in the first side, two connecting portions CP1 and CP2 cross the segments L3 in the outermost turn of the coil 160, and another two connecting portions CP1 and CP2 cross the segments L3 in the third turn of the coil 160. Moreover, in the first side, the corresponding segments L1 and L2 cross the connecting portion CP3 in the outermost turn of the coil 160, and another corresponding segments L1 and L2 cross the connecting portion CP3 in the third turn of the coil 160. Based on the symmetrical structure, in the second side (e.g., the side along the direction of +X) of the coil 160, each of the coil 120 and the coil 140 crosses the coil 160 four times as well.

Similarly, in the third side (e.g., the side along the direction of +Y) of the coil 160, each of the coil 120 and the coil 140 crosses the coil 160 four times. In the fourth side (e.g., the side along the direction of −Y) of the coil 160, each of the coil 120 and the coil 140 crosses the coil 160 six times. In some embodiments, the first side and the second side are opposite sides of the coil 160 (e.g., a left side and a right side of the coil 160), and the third side and the fourth side are opposite sides of the coil 160 (e.g., a upside and a downside of the coil 160). In greater detail, in the third side, the segments L1 in the outermost turn of the coil 120 and the segments L2 in the outermost turn of the coil 140 cross the connecting portions CP3 between the first turn and the second turn of the coil 160. In the third side, the segment L1 in the third turn of the coil 120 and the segment L2 in the fourth turn of the coil 140 cross the connecting portion CP3 between the third turn and the fourth turn of the coil 160, and the connecting portion CP1 between the third turn and the fourth turn of the coil 120 and the connecting portion CP2 between the third turn and the fourth turn of the coil 140 cross the segment L3 in the third turn of the coil 160. Similarly, in the fourth side, the segments L1 in the first turn of the coil 120 and the segments L2 in the first turn of the coil 140 cross the connecting portions CP3 between the first turn and the second turn of the coil 160, and the segment L1 in the second turn of the coil 120 and the segment L2 in the second turn of the coil 140 cross the connecting portion CP3 between the second turn and the third turn of the coil 160. In the fourth side, the segments L1 in the third turn of the coil 120 and the segments L2 in the third turn of the coil 140 cross the connecting portions CP3 between the third turn and the fourth turn of the coil 160, and the connecting portions CP1 between the third turn and the fourth turn of the coil 120 and the connecting portions CP2 between the third turn and the fourth turn of the coil 140 cross the segment L3 in the third turn of the coil 160.

With the above arrangement, the coils 120, 140, and 160 may form crossing portions via the connection portions CP1, CP2, and CP3, respectively. According to different purposes of circuit applications, a direction of the current on the connecting portions CP1 and that on the connection portions CP2 may be set to be the same or different. An inductance value of the connecting portions CP1 and that of the connecting portions CP2 may be changed significantly according to different current directions, and thus the current direction may be controlled to meet different purposes of circuit applications. Equivalently, the segments L1, L2, and L3 may be twisted around each other via the connecting portions CP1, CP2, and CP3. With such arrangements of the embodiment, both of the connecting portions CP1 and CP2 are able to uniformly couple with the connecting portions CP3.

In some embodiments, a part of the segments L3 are coupled in parallel with each other via the connecting portions CP3, and at least one part in the segments L1 and at least one part in the segments L2 are arranged between the part of the segments L3. For example, as shown in FIG. 1C, the segments L3 in a first turn (e.g., the outermost turn) and a second turn of the coil 160 are coupled in parallel with each other via the connecting portions CP3. The segments L3 in a third turn and a fourth turn (e.g., an inner turn) of the coil 160 are coupled in parallel with each other via the connecting portion CP3. As shown in FIG. 1A, most segments L1 and L2 are arranged between the first turn and the second turn of the coil 160, and located between the third turn and the fourth turn of the coil 160. In this example, the outermost turn of the coil 120 or 140 is arranged outside of the coil 160. In other words, a range of each of the coils 120 and 140 partially overlaps a range of the coil 160. With the above arrangements, the coil 160 is able to couple the coil 120 and the coil 140. As a result, a signal received by the coil 160 may be simultaneously coupled to the coil 140 and the coil 120, in order to output two sets of differential signals. Alternatively, differential signals received by the coil 140 and the coil 120 may be coupled to the coil 160, in order to be combined as a single signal.

In some embodiments, the coil 120 may include additional connecting portions CP1 (not shown) and additional vias (not shown), which may be configured to couple the segments L1 in the innermost turn. In some embodiments, as shown in FIG. 1A to FIG. 1C, the segments L1, L2, and L3 may be implemented with a first metal layer, the connecting portions CP1, CP2, and CP3 may be implemented with a second metal layer, and the first metal layer is different from the second metal layer. For example, the first metal layer may be (but not limited to) an ultra-thick metal (UTM) layer, and the second metal layer may be (but not limited to) a re-distribution layer (RDL).

Figure 2:
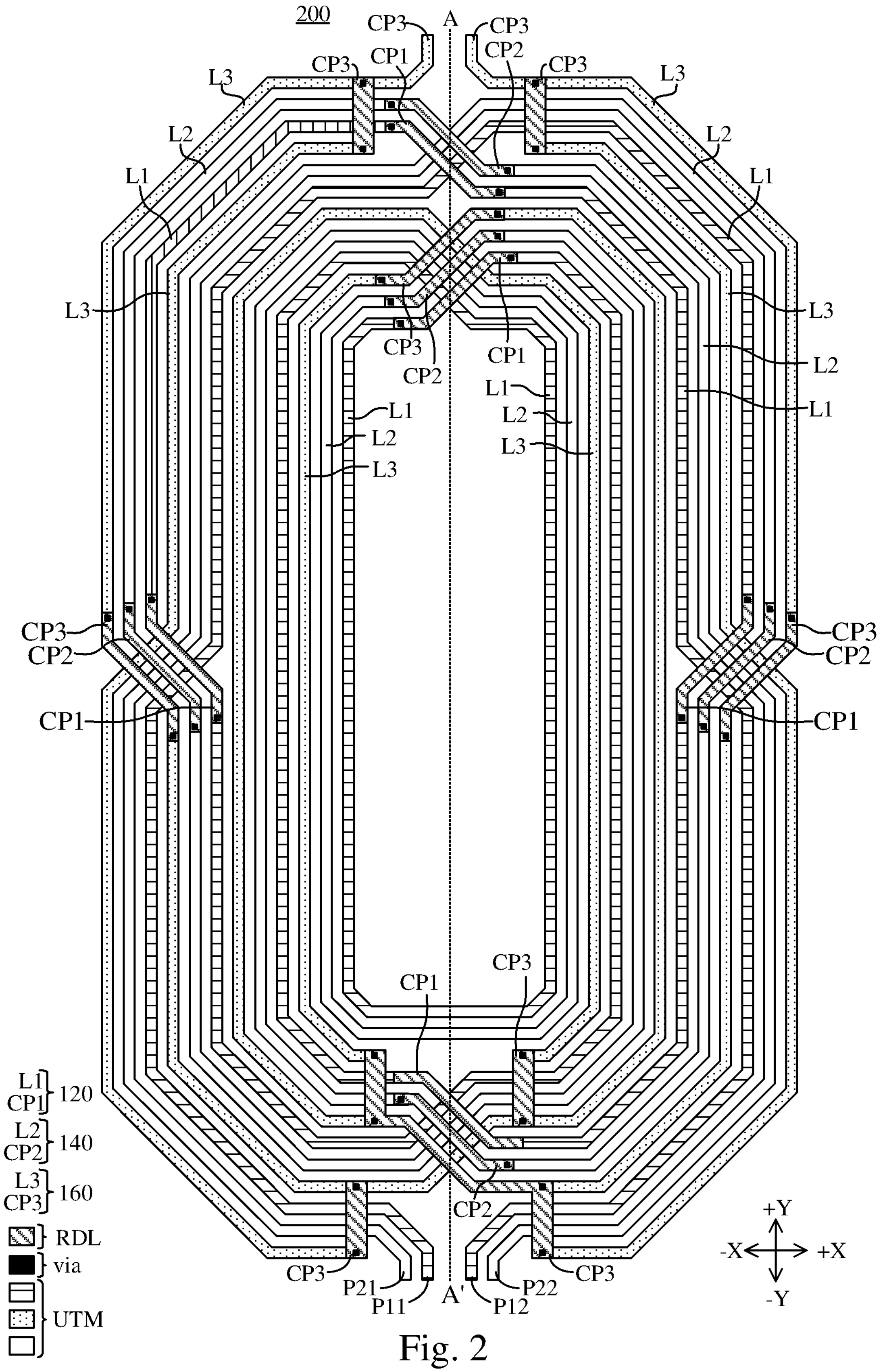
FIG. 2 is a schematic diagram of a transformer device according to some embodiments of the present disclosure.

FIG. 2 is a schematic diagram of a transformer device 200 according to some embodiments of the present disclosure. Compared with the transformer device 100 in FIG. 1A, in this example, a number of crossing portions in the transformer device 200 is lower. Each of the coils 120 and 140 crosses the coil 160 twice in the first side of the coil 160, and crosses the coil 160 twice in the second side of the coil 160. In some embodiments, certain turns (e.g., the outermost turn and a second turn adjacent to the outermost turn) in both of the first winding (which may be, for example, formed with the segments L1 and the connecting portions CP1) and the second winding (which may be, for example, formed with the segments L2 and the connecting portions CP2) form crossing portions in the first side and the second side of the coil 160. In greater detail, in the first side, two connecting portions CP1 and CP2 cross the segments L3 in the outermost turn of the coil 160, and the corresponding segments L1 and L2 cross the connecting portion CP3 in the outermost turn of the coil 160. Compared with FIG. 1A, in this example, the coils 120 and 140 do not cross the third turn (or the innermost turn) of the coil 160 in the first side of the coil 160, and do not cross the third turn (or the innermost turn) of the coil 160 in the second side of the coil 160. In this example, the innermost turn and the third turn adjacent to the innermost turn in the each of the first winding and the second winding and the coil 160 do not form crossing portions in the first side and the second side.

In other words, in the first side and the second side, the third turn and the fourth turn in the coil 120 are directly formed with the segments L1 (i.e., without connecting portions CP1), and the third turn and the fourth turn in the coil 140 are directly formed with the segments L2 (i.e., without connecting portions CP2), and the third turn and the fourth turn in the coil 160 are directly formed with the segments L3 (i.e., without connecting portions CP3). As a result, the number of the crossing portion is lower. In different applications, the number of the crossing portions may be utilized to adjust an inductance ratio among the coils 120, 140, and 160. For example, if the number of the crossing portions is higher, the capacitance and the mutual inductance among the coils 120, 140, and 160 will be higher, which improves the mutual inductance among the coils 120, 140, and 160.

Figure 3:
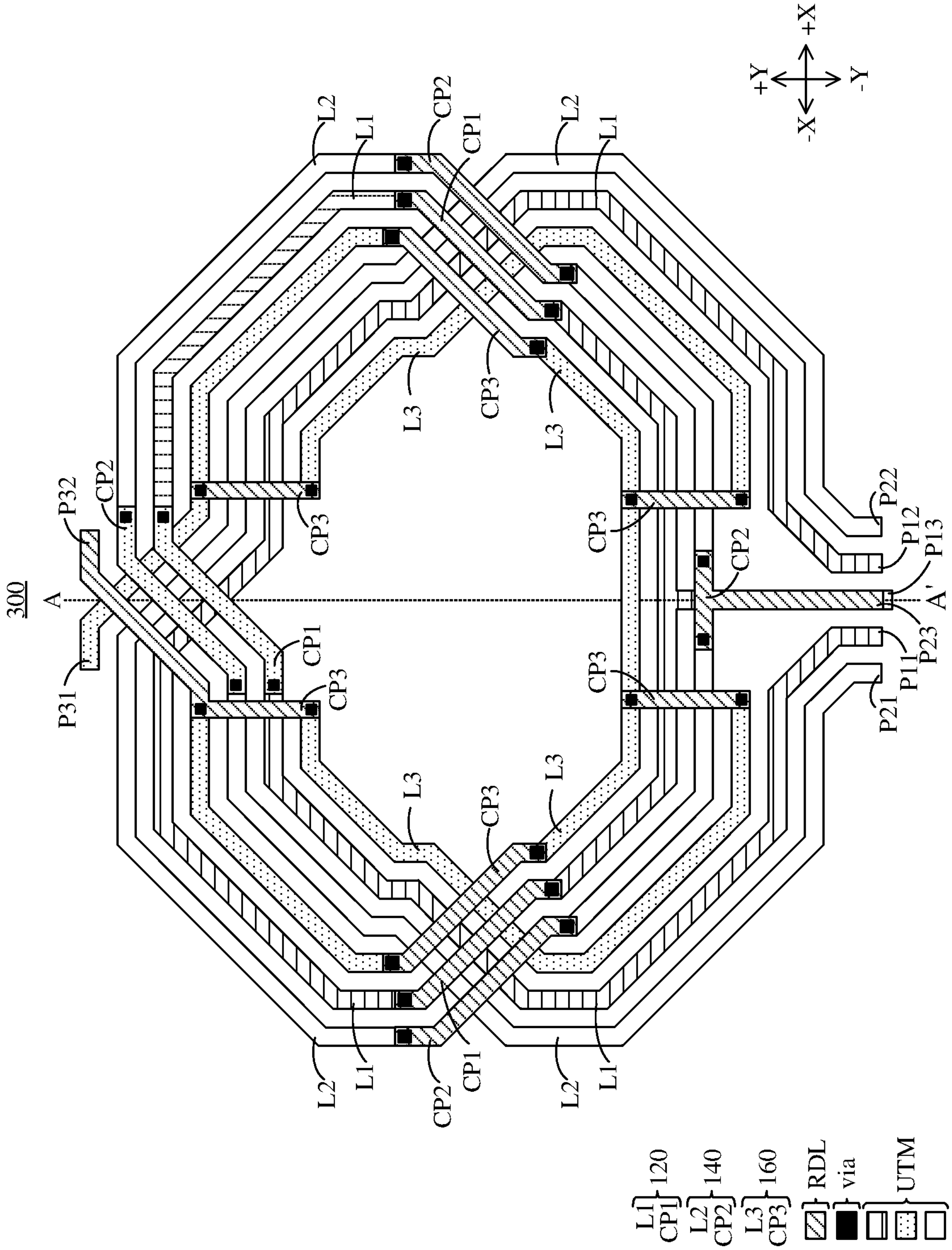
FIG. 3 is a schematic diagram of a transformer device according to some embodiments of the present disclosure.

FIG. 3 is a schematic diagram of a transformer device 300 according to some embodiments of the present disclosure. Compared with the transformer device 100 in FIG. 1A or the transformer device 200 in FIG. 2, the coils 120, 140, and 160 in FIG. 3 have different number of turns.

In this example, the segments L1 and the connecting portions CP1 form a first winding having two turns. For example, form the terminal P11 to the terminal P12, the segments L1 and the connecting portions CP1 sequentially form about a quarter of the first turn (e.g., the outermost turn), about a quarter of the second turn (e.g., the innermost turn), about a quarter of the first turn, about a half of the second turn, about a quarter of the first turn, about a quarter of the second turn, and about a quarter of the first turn.

Similarly, the segments L2 and the connecting portions CP2 form a second winding having two turns. For example, from the terminal P21 to the terminal P22, the segments L2 and the connecting portions CP2 sequentially form about a quarter of the first turn (e.g., the outermost turn), about a quarter of the second turn (e.g., the innermost turn), about a quarter of the first turn, about a half of the second turn, about the quarter of the first turn, about the quarter of the second turn, and about a quarter of the first turn.

In this example, the coil 120 further includes a terminal P13, which is a middle terminal between the terminal P11 and the terminal P12. In some embodiments, the terminal P13 may be a center tap terminal. The terminal P13 may be extended along the direction of −Y through an additional segment L1, in order to receive a common mode voltage (e.g., an AC ground voltage). Similarly, the coil 140 further includes a terminal P23, which is a middle terminal between the terminal P11 and the terminal P22. In some embodiments, the terminal P23 may be a center tap terminal. The terminal P23 may be extended along the direction of −Y through an additional connecting portion CP2, in order to receive the common mode voltage.

In this example, the segments L3 in the outermost turn and the innermost turn of the coil 160 are coupled in parallel with each other via the connecting portions CP3. A part of the segments L1 and a part of the segments L2 are arranged between the segments L3 that are coupled in parallel with each other. For example, the segments L1 in the second turn of the coil 120 and the segments L2 in the second turn of the coil 140 are arranged between the segments L3 that are coupled in parallel with each other. In this example, the range of each of the coils 120 and 140 partially overlaps the range of the coil 160, and the outermost turn of the coil 120 or 140 is arranged outside the coil 160. With the above arrangement, the coil 160 is able to couple the coils 120 and 140.

Similar to FIG. 1A, in the first side (e.g., a side along the direction of −X) and the second side (e.g., a side along the direction of +X) of the coil 160, the coil 160 and each turn in the first winding and the second winding form crossing portions. In FIG. 3, each of the coils 120 and 140 crosses the coil 160 twice in the first side of the coil 160, and crosses the coil 160 twice in the second side of the coil 160. For example, in the first side, the connecting portions CP1 and CP2 cross the segment L3 in the innermost loop of the coil 160, and the corresponding segments L1 and L2 cross the connecting portion CP3 in the outermost turn of the coil 160. Based on the symmetrical structure, each of the coils 120 and 140 crosses the coil 160 twice in the second side of the coil 160. Similarly, each of the coils 120 and 140 crosses the coil 160 four times in the third side of the coil 160, and crosses the coil 160 twice in the fourth side of the coil 160, in which the third side and the fourth side are the other two opposite sides of the coil 160. With the above arrangement, the coils 120, 140, and 160 may form crossing portions via the connecting portions CP1, CP2, and CP3, respectively. Similar to the transformer device 100 in FIG. 1A, the segments L1, L2, and L3 may be twisted around each other via the connecting portions CP1, CP2, and CP3.

Figure 4:
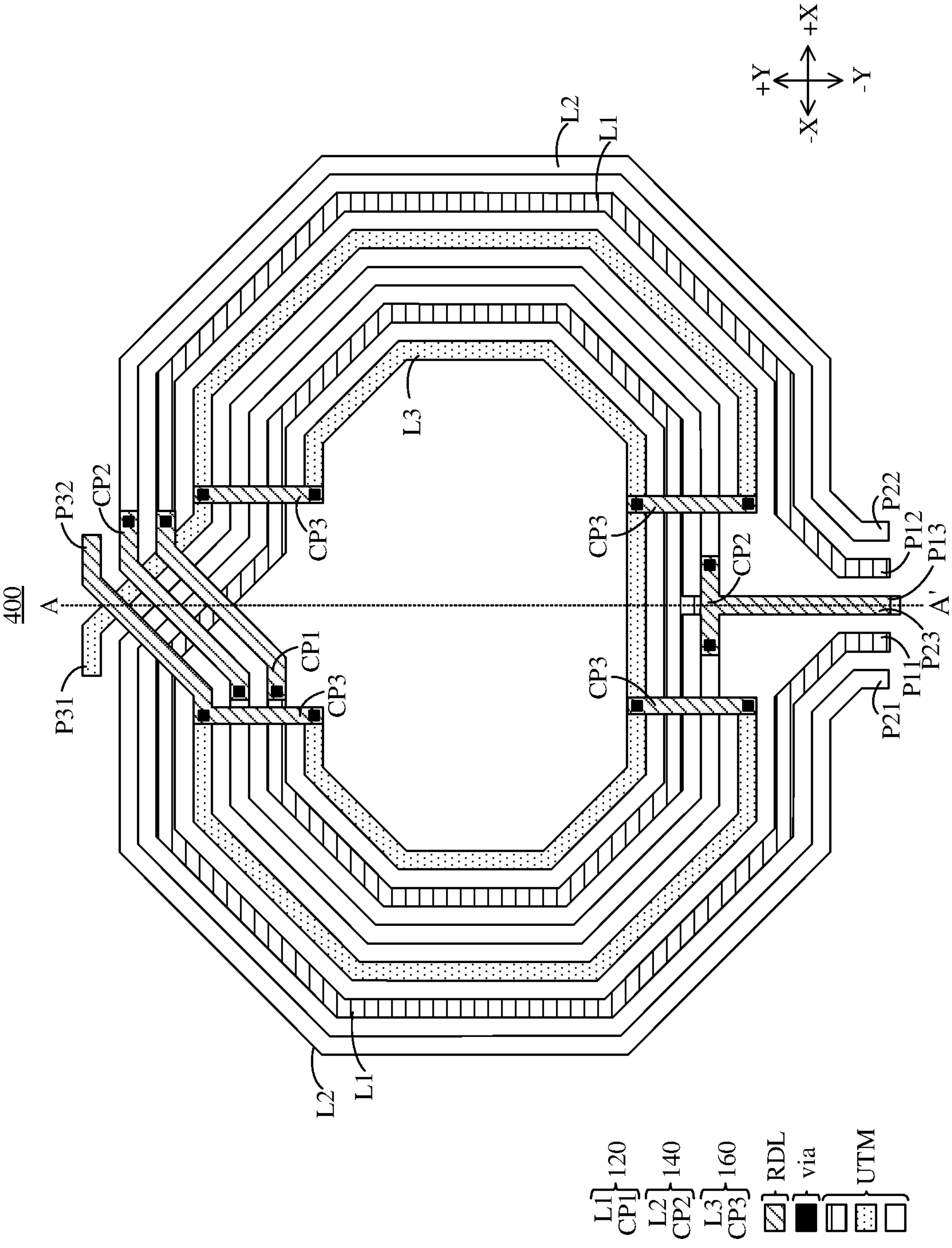
FIG. 4 is a schematic diagram of a transformer device according to some embodiments of the present disclosure.

FIG. 4 is a schematic diagram of a transformer device 400 according to some embodiments of the present disclosure. Compared with the transformer device 300 in FIG. 3, in this example, a number of the crossing portions in the transformer device 400 is lower. In greater detail, each of the coil 120 and 140 does not cross the coil 160 in the first side and the seconds side of the coil 160. In other words, in the first side and the second side, the first turn and the second turn in the coils 120, 140, 160 are directly formed with the segments L1, L2, and L3, respectively (i.e., without the connecting portions CP1, CP2, or CP3). As a result, the number of the crossing portions is lower, in order to achieve different inductance ratio.

Figure 5:
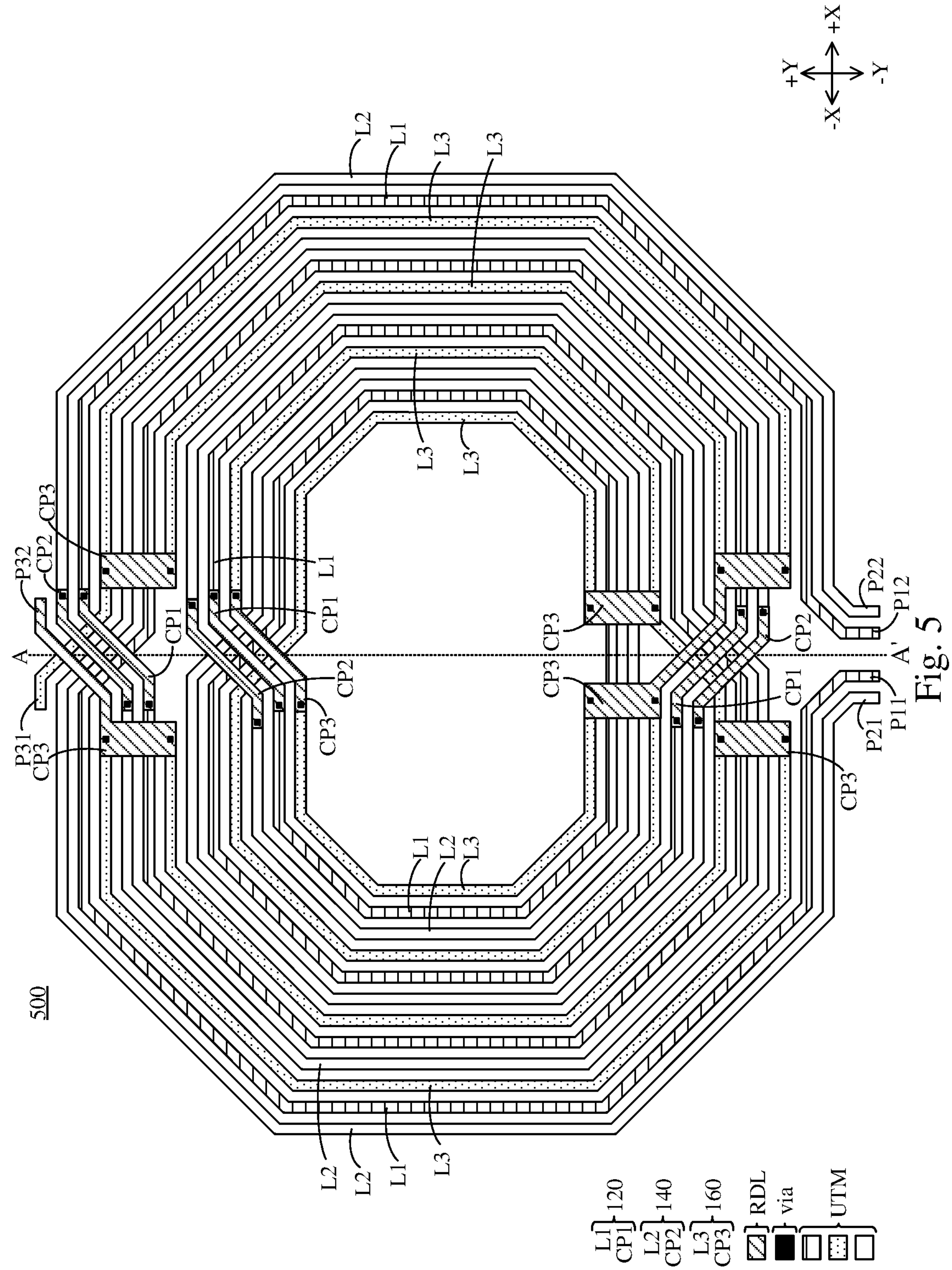
FIG. 5 is a schematic diagram of a transformer device according to some embodiments of the present disclosure.

FIG. 5 is a schematic diagram of a transformer device 500 according to some embodiments of the present disclosure. Although the shape and the entire area are different from the transformer device 100 in FIG. 1A, the arrangement of the transformer device 500 is similar to that of the transformer device 100. Similar to the transformer device 100 in FIG. 1A or the transformer device in FIG. 2, each of the coils 120, 140, and 160 is a winding having four turns. Compared with the transformer device 100 in FIG. 1A, in this example, the coil 120 only includes one connecting portion CP1, and the coils 120, 140, and 160 are directly formed through the segments L1, L2, and L3, respectively, in the first side (e.g., the side along the direction of −X) and the second side (e.g., the direction of +X). In other words, compared with the transformer device 100, the number of crossing portions in the transformer device 500 is lower.

In greater detail, from the terminal P11 to the terminal P12, the segments L1 and the connecting portions CP1 sequentially form about a half of the first turn (e.g., the outermost turn), about a half of the second turn, about a half of the third turn, the fourth turn (e.g., the innermost turn), about a half of the third turn, about a half of the second turn, and about a half of the first turn. Similarly, from the terminal P21 to the terminal P22, the segments L2 and the connecting portions CP2 sequentially form about a half of the first turn (e.g., the outermost turn), about a half of the second turn, about a half of the third turn, the fourth turn (e.g., the innermost turn), about a half of the third turn, about a half of the second turn, and about a half of the first turn.

The segments L3 in the first turn (e.g., the outermost turn) and the second turn of the coil 160 are coupled in parallel with each other via the connecting portions CP3. The segments L3 in the third turn and the fourth turn (e.g., the innermost turn) of the coil 160 are coupled in parallel with each other via the connecting portions CP3. A first part of the segments L1 and L2 is arranged between the first turn and the second turn of the coil 160, and a second part of the segments L1 and L2 is arranged between the third turn and the fourth turn of the coil 160. The segments L1 forming the outermost turn of the coil 120 and the segments L2 forming the outermost turn of the coil 140 are arranged outside the outermost turn of the coil 160. In this example, the range of the coil 160 partially overlaps the range of each of the coils 120 and 140. With such arrangement, the coil 160 is able to couple the coils 120 and 140.

On the other hand, in this example, the coils 120 and 140 cross the coil 160 six times in the third side of the coil 160, and cross the coil 160 six times in the fourth side of the coil 160, in which the third side and the fourth side are two opposite sides of the coil 160. For example, the third side is a side along the direction of +Y, and the fourth side is a side along the direction of −Y. In greater detail, in the third side, the segments L1 in the outermost turn of the coil 120 and the segments L2 in the outermost turn of the coil 140 cross the connecting portions CP3 between the first turn and the second turn of the coil 160, and the connecting portions CP1 in the outermost turn of the coil 120 and the connecting portions CP2 in the outermost turn of the coil 140 cross the segments L3 in the outermost turn of the coil 160. In the third side, the segments L1 in the third turn of the coil 120 and the segments L2 in the fourth turn of the coil 140 cross the connecting portions CP3 between the third turn and the fourth turn of the coil 160. Similarly, in the fourth side, the segment L1 in the second turn of the coil 120 and the segments L2 in the second turn of the coil 140 cross the connecting portions CP3 between the first turn and the second turn of the coil 160, and the connecting portion CP1 between the second turn and the third turn of the coil 120 and the connecting portion CP2 between the second turn and the third turn of the coil 140 cross the segments L3 in the third turn of the coil 160. In the fourth side, the segments L1 in the innermost turn of the coil 120 and the segments L2 in the innermost turn of the coil 140 cross the connecting portions CP3 between the third turn and the fourth turn of the coil 160.

With above arrangements, the coils 120, 140, and 160 may form crossing portions via the connection portions CP1, CP2, and CP3, respectively. Equivalently, the segments L1, L2, and L3 may be twisted around each other via the connecting portions CP1, CP2, and CP3.

The above implementations (e.g., a number of turns, materials, a number of terminals, shapes, etc.) and application examples about the above transformer devices 100, 200, 300, 400, and 500 are given for illustrative purposes, and the present disclosure is not limited thereto. For example, the shape of the coil 120, the coil 140, and the coil 160 may be other polygons or circle. The number of turns in the coil 120, the coil 140, and the coil 160, or a wire distance between segments can be adjusted according to practical requirement.

As described above, the transformer device in some embodiments of the present disclosure may utilize three coils to implement an inductor structure having mirror-symmetry. As a result, the transformer device may achieve a better wire balance, in order to be applied to a power combiner, a balance-to-unbalance conversion, an unbalance-to-balance conversion, and so on. Moreover, according to different applications, the transformer device may utilize twisted wires to achieve uniform coupling.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A transformer device, comprising:

a first coil comprising a plurality of first segments and at least one first connecting portion, wherein the plurality of first segments are coupled to each other through the at least one first connecting portion;

a second coil comprising a plurality of second segments and a plurality of second connecting portions, wherein the plurality of second segments are coupled to each other through the plurality of second connecting portions; and a third coil configured to couple the first coil and the second coil, wherein the third coil comprises a plurality of third segments and a plurality of third connecting portions, a part of the plurality of third segments are coupled in parallel with each other through the plurality of third connecting portions, and at least one part of the plurality of first segments and at least one part of the plurality of second segments are arranged between the part of the plurality of third segments, and an outermost turn in the first coil or the second coil is arranged in the third coil, wherein the plurality of first segments and the at least one first connecting portion form a winding having a first turn, a second turn, a third turn, and a fourth turn, and the plurality of first segments and the at least one first connecting portion sequentially form, from a first terminal of the first coil to a second terminal of the first coil, a quarter of the first turn, a quarter of the second turn, a quarter of the first turn, a quarter of the second turn, a quarter of the third turn, a quarter of the fourth turn, a quarter of the third turn, a half of the fourth turn, a quarter of the third turn, a quarter of the fourth turn, a quarter of the third turn, a quarter of the second turn, a quarter of the first turn, a quarter of the second turn, and a quarter of the first turn.

2. The transformer device of claim 1, wherein the plurality of first segments, the plurality of second segments, and the plurality of third segments are twisted around each other through the at least one first connecting portion, the plurality of second connecting portions, and the plurality of third connecting portions.

3. The transformer device of claim 1, wherein the plurality of first segments, the plurality of second segments, the plurality of third segments, the at least one first connecting portion, the plurality of second connecting portions, and the plurality of third connecting portions form a plurality of crossing portions in two opposite sides of the third coil.

4. The transformer device of claim 3, wherein the two opposite sides are a first side and a second side of the third coil, and the plurality of crossing portions in the first side are symmetric to the plurality of crossing portions in the second side.

5. The transformer device of claim 3, wherein the two opposite sides are a first side and a second side of the third coil, and each of the first coil and the second coil crosses the third coil four times in the first side, and crosses the third coil four times in the second side.

6. The transformer device of claim 3, wherein the two opposite sides are a first side and a second side of the third coil, and each of the first coil and the second coil crosses the third coil twice in the first side, and crosses the third coil twice in the second side.

7. The transformer device of claim 3, wherein each of the first coil and the second coil comprises a plurality of terminals, and the plurality of terminals are not arranged in the two opposite sides.

8. The transformer device of claim 1, wherein the plurality of first segments and the at least one first connecting portion form a first winding, the plurality of second segments and the plurality of second connecting portions form a second winding, and the third coil and each turn in both of the first winding and the second winding form a plurality of crossing portions in two opposite sides of the third coil.

9. The transformer device of claim 1, wherein the plurality of first segments and the at least one first connecting portion form a first winding, the plurality of second segments and the plurality of second connecting portions form a second winding, and the third coil and a part of turns in both of the first winding and the second winding form a plurality of crossing portions in two opposite sides of the third coil.

10. The transform device of claim 1, wherein the plurality of first segments and the at least one first connecting portion form a first winding, the plurality of second segments and the plurality of second connecting portions form a second winding, and the third coil and an innermost turn and a turn adjacent to the innermost turn in each of the first winding and the second winding do not form a plurality of crossing portions in two opposite sides of the third coil.

11. The transformer device of claim 1, wherein a range of each of the first coil and the second coil partially overlaps a range of the third coil.

12. The transformer device of claim 1, wherein the first coil or the second coil substantially has a mirror-image symmetry.

13. The transformer device of claim 1, wherein the plurality of first segments, the plurality of second segments, and the plurality of third segments are implemented with a first metal layer, and the at least one first connecting portion, the plurality of second connecting portions, and the plurality of third connecting portions are implemented with a second metal layer, and the first metal layer is different from the second metal layer.

14. The transformer device of claim 1, wherein the third coil substantially has a mirror-image symmetry.

15. The transformer device of claim 1, wherein the first coil and the second coil are configured to output a set of differential signals, and the third coil is configured to receive a single-end signal.

16. The transformer device of claim 1, wherein the plurality of first segments and the at least one first connecting portion form a first winding having two turns or four turns, and the plurality of second segments and the plurality of second connecting portions form a second winding having two turns or four turns.

17. The transformer device of claim 1, wherein both an outermost turn in the first coil and an outermost turn in the second coil are arranged in the third coil.

* * * * *